April 16, 1929.  J. H. BRADY  1,709,770
FILLING AND DISPENSING APPARATUS
Filed July 26, 1923   3 Sheets-Sheet 1
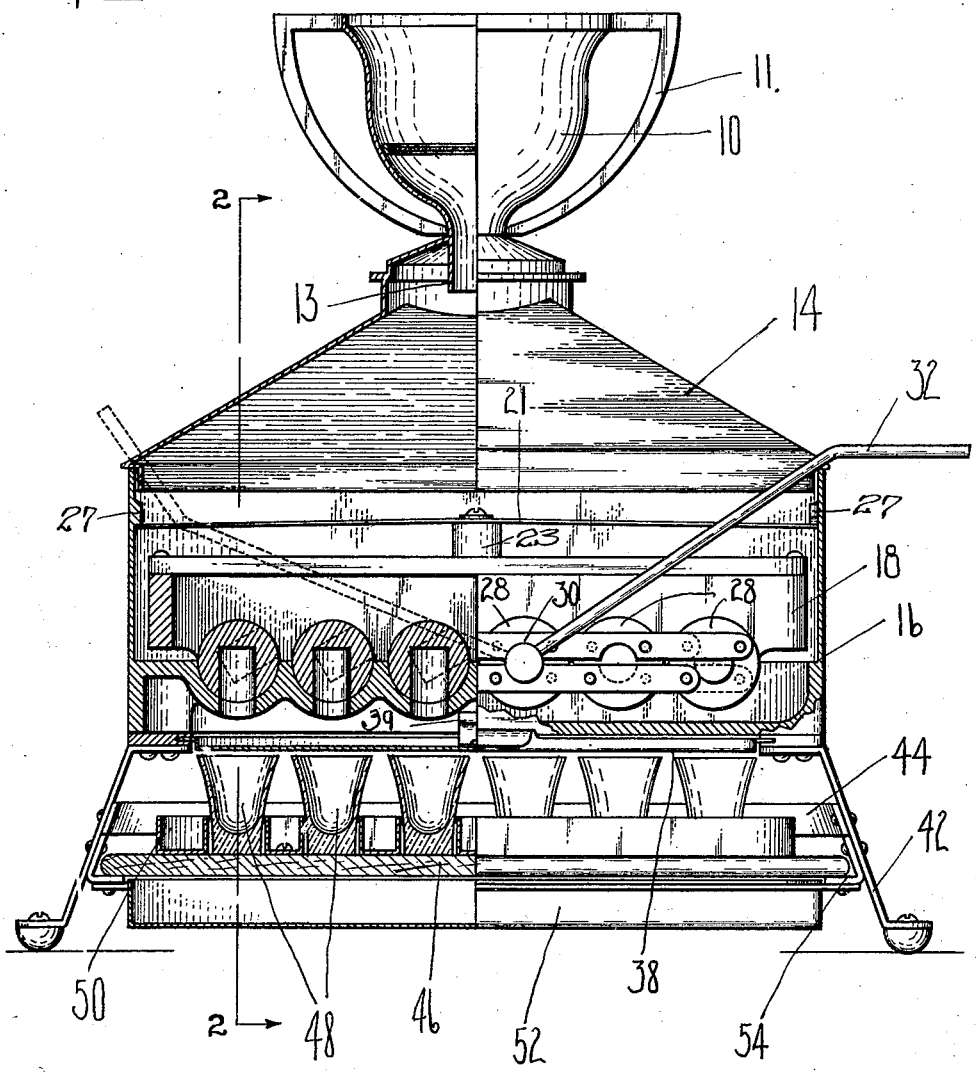
INVENTOR.
James H. Brady
BY
Albert J. Fihe  ATTORNEY.

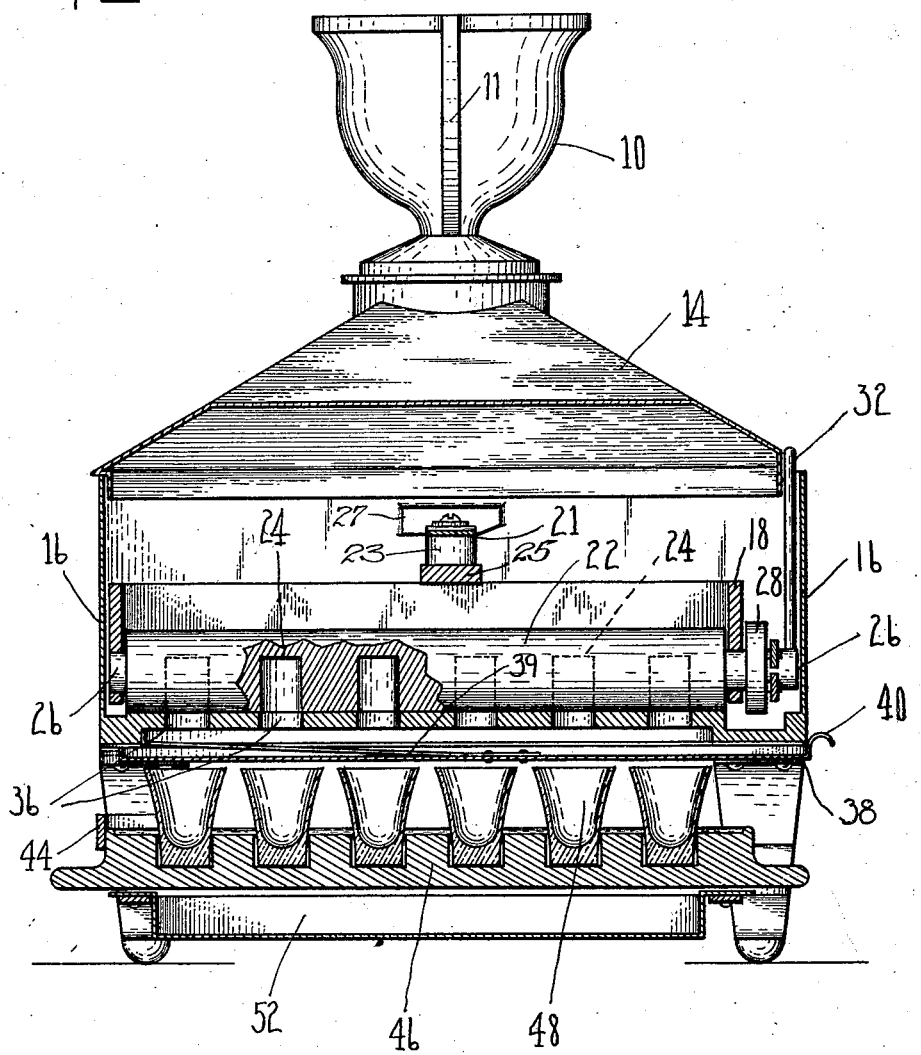

April 16, 1929.    J. H. BRADY    1,709,770
FILLING AND DISPENSING APPARATUS
Filed July 26, 1923    3 Sheets-Sheet 3
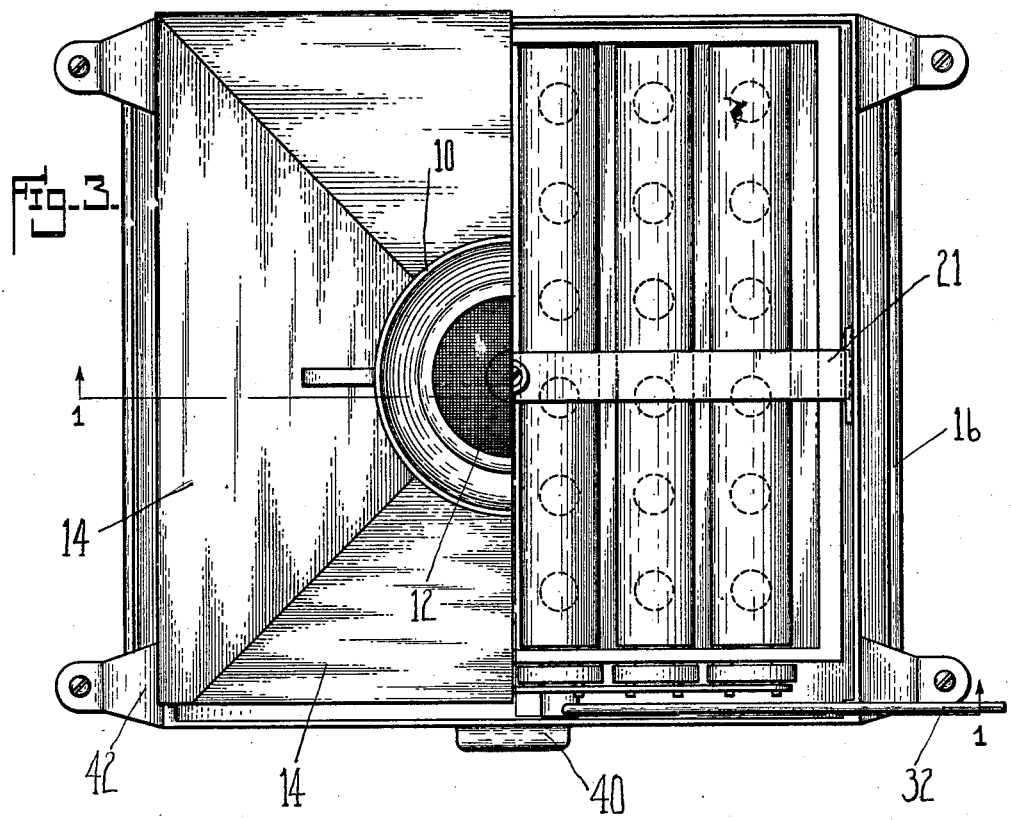
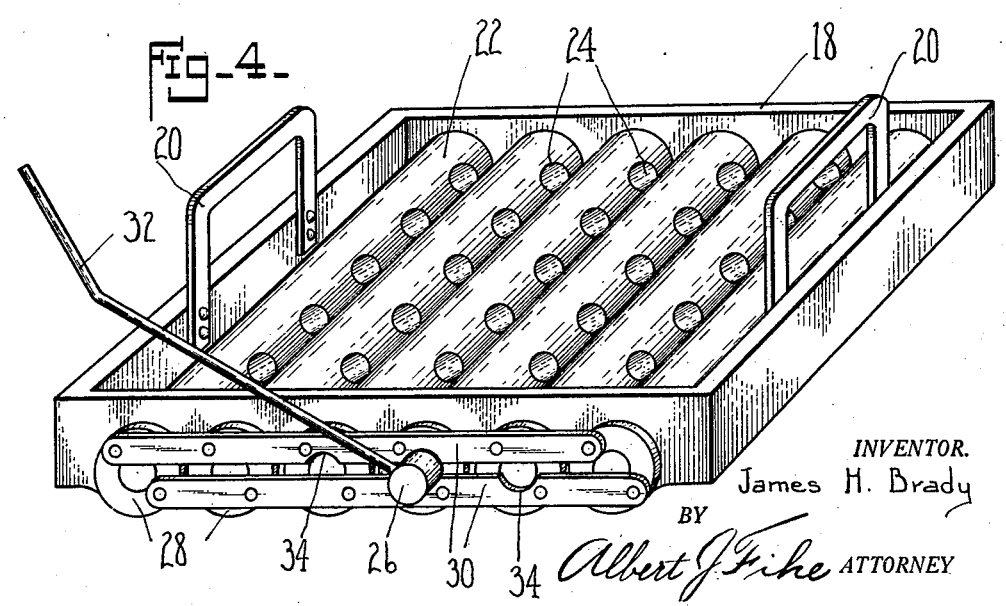
INVENTOR.
James H. Brady
BY
Albert J. Fike ATTORNEY Patented Apr. 16, 1929.

1,709,770

UNITED STATES PATENT OFFICE.

JAMES H. BRADY, OF LOUISVILLE, KENTUCKY, ASSIGNOR OF ONE-HALF TO (MRS.) ELLA T. NORTON, OF LOUISVILLE, KENTUCKY.

FILLING AND DISPENSING APPARATUS.

Application filed July 26, 1923. Serial No. 653,890.

This invention relates to improvements in filling and dispensing apparatus and has for its principal object the provision of a simple convenient device for dispensing sacramental wine or the like and for filling communion glasses without any danger of waste or spilling.

One of the important objects of this invention is the provision of a device for filling a plurality of communion glasses or other receptacles at a single operation and with a measured quantity of liquid.

Another important object of this invention is the provision in a unitary apparatus of a goblet for holding sacramental wine or the like, and a non-leakable readily operated filling and dispensing apparatus in conjunction therewith.

A still further important object of this invention is to provide in a filling and dispensing apparatus a plurality of dispensing rollers having sockets therein for the reception and transmission of a measured quantity of liquid, which rollers are so arranged that there will be no possibility of leakage, and the operation of which is such that all the rollers will be turned for delivery purposes in the same direction at the same time.

Other and further important objects of the invention will be apparent from the disclosures in the accompanying drawings and following specifications.

The invention, in a preferred form, is illustrated in the drawings and hereinafter more fully described.

In the drawings:—

Figure 1 is a front elevation of the improved filling and dispensing apparatus of this invention, portions being shown in section as illustrated by the broken line 1—1 of Figure 3, the operation being shown in dotted lines.

Figure 2 is a sectional view taken on the line 2—2 of Figure 1.

Figure 3 is a top plan view of the device showing one half of the cover removed or broken away.

Figure 4 is a detail perspective view of the dispensing frame with the delivery rollers in position therein and illustrating the operating means.

As shown in the drawings:—

The reference numeral 10 indicates generally a communion goblet for the dispensing of sacramental wine or the like, but which, of course, may be replaced in other modifications of the invention by an ordinary hopper or other convenient receptacle. Handles 11 are provided and a screen or sieve 12 is positioned in the goblet 10 as illustrated for the purpose of straining the material.

The goblet 10 is securely attached to a form of lid or cover 14 which is positioned upon the main body portion 16 of the dispensing apparatus and is readily removable therefrom. A tubular extension 13 extends downwardly from the goblet 10 as illustrated for the purpose of preventing the wine or grape juice from adhering to the underside of the top and running down. The body 16 is in the form of an open container and is preferably square in cross section, but the shape may obviously be varied as desired or convenient.

A dispensing tray 18 is adapted to be positioned in the body 16 as illustrated in the drawings, and is so constructed so as to be readily removable therefrom, as illustrated in Figure 4, the tray in this instance being provided with handles 20, whereby ready access may be had to the same. A spring leaf or other suitable retaining means 21 is positioned in the container 16 and is adapted for securely maintaining the tray 18 in proper position.

The spring 21 is pivotally mounted on a cylindrical support or the like 23, and this, in turn, is supported upon a bar 25 adapted to be positioned transversely across the top of the tray 18, as best shown in Figure 2. The ends of the spring ride under retaining lugs 27 formed integral with the sides of the casing 16, and it will be obvious that when the spring 21 is locked in position as shown in Figure 1, a liquid-tight connection will be formed between the rollers 28 in the bottom of the tray 18 and the semi-cylindrical seats for the rollers.

The bottom of the tray 18 is provided with a plurality of delivery rollers, as shown at 22, each roller having a plurality of dispensing openings or sockets 24 therein. At each end of a roller 22 is provided an extending shaft 26 which is journaled in suitable bearings in the sides of the tray 18. One end of the extending shaft 26 extends beyond the side of the tray 18 and is fitted with a disc or other operating element as best illustrated at 28. A number of these discs 28 corresponding to the number of rollers 22 are positioned alongside one of the frame members of the tray 18 and to each disc 28 is pivotally connected a pair of operating members 30, as best illustrated in Figures 1 and 4. These operating members 30 are in the form of longitudinally extending bars, each bar having a pivotal connection with every one of the discs 28, and the connections of the two bars with each disc 28 are made at points diametrically opposite thereon.

One of the extending shafts 26 is prolonged beyond the operating bars 30 and is provided with a handle or lever 32 adapted to be manually operated, as illustrated by the dotted and full line positions in Figure 1. Proper notches 34 are cut in the corresponding portions of the upper and lower bars 30 so that the operation of the device will be assured.

Openings as best illustrated at 36 in Figure 2 are provided in the bottom of the tray 18 adapted for proper co-operation with the sockets 24 in the delivery rollers 22, so that ready delivery of material from the tray 18 will be assured. A removable drip pan in the form of a shallow member 38 is provided, as best illustrated in Figures 1 and 2, and is equipped with a handle 40 extending through a proper slot in the side of the container 16, which drip pan is adapted to be directly underneath the tray 18 for the purpose of catching any drippings or overflow when the receptacles are not in position thereunder or whenever the device is not being operated. A suitable stop in the form of a leaf spring 39 is provided in the drip pan 38.

The body member 16 is suitably supported by means of a stand comprising legs 42 and a metallic strap or brace member 44, and in this stand is adapted to be positioned a tray 46 provided for the support in pre-determined arrangement of a number of communion cups or other receptacles 48. A metal ring 50 is provided on the tray 46 extending around the periphery thereof to prevent wine or other liquid from running off the tray should any be spilled or dropped from the receptacle, which might happen if the drip pan 38 be forgotten. An additional drip pan 52 is provided attached to the legs 48 by means of brackets 54 so that all possibility of spilling or leakage is practically removed.

It will be seen that herein is provided a device for accurately dispensing measured quantities of liquid to a plurality of receptacles at a single operation, and which eliminates to a great degree any danger of leakage or spilling. Further, the method of rotating the filling rollers is superior and constitutes quite an improvement over the ordinary gear wheel drive used in such constructions, as excess reversing movement is avoided and also all tendency to lift the rollers from the bearings is removed.

The rollers may be made of aluminum or other suitable material and provided with steel packets nickel plated if desired, or can be formed from hollow tubing if preferred.

It will be evident that the operation may be repeated as often as desired, all that is necessary being the replenishing of the hopper 10 and the insertion of a fresh tray of empty cups before each dispensing movement of the lever 32.

I am aware that many changes may be made and numerous details of construction varied throughout a wide range without departing from the principle of this invention, and I, therefore, do not purpose limiting the patent granted hereon otherwise than as necessitated by the prior art.

I claim as my invention:—

A filling and dispensing apparatus including in combination a casing, a removable cover for said casing, a removable tray containing a plurality of dispensing rollers removably positioned in the casing, means for simultaneously operating said dispensing rollers in the same direction, said means comprising shafts for the rollers extending beyond one side of the tray, a disc on the end of each shaft, a pair of operating bars connecting all of said discs, a single handle for simultaneously moving all of the rollers into filling and into discharging position alternately, a receptacle support adapted to be removably positioned beneath said tray, a resilient means for maintaining said removable tray with its dispensing rollers in operative position, said means comprising a leaf spring pivotally attached at its middle point to the tray, and latch means on the casing for receiving the ends of said spring.

In testimony whereof I affix my signature.

JAMES H. BRADY.